United States Patent
Johnson et al.

[19]
[11] Patent Number: 6,141,901
[45] Date of Patent: Nov. 7, 2000

[54] PEST CONTROL SYSTEM

[75] Inventors: Roger D. Johnson, Richfield; Thomas T. Danley, Apple Valley, both of Minn.

[73] Assignee: Rupp Industries, Inc., Burnsville, Minn.

[21] Appl. No.: 09/395,125

[22] Filed: Sep. 14, 1999

[51] Int. Cl.[7] .................................................. A01M 1/20
[52] U.S. Cl. .................................. 43/124; 43/132.1
[58] Field of Search ...................... 43/124, 130, 132.1, 43/144

[56] References Cited

U.S. PATENT DOCUMENTS

| | | |
|---|---|---|
| 1,817,535 | 8/1931 | Spanel . |
| 2,469,963 | 5/1949 | Grosjean et al. . |
| 3,124,893 | 3/1964 | Glenn . |
| 3,782,026 | 1/1974 | Bridges et al. . |
| 4,637,161 | 1/1987 | Turner . |
| 4,640,044 | 2/1987 | Varnon . |
| 4,716,676 | 1/1988 | Imagawa ................................... 43/130 |
| 4,817,329 | 4/1989 | Forbes . |
| 4,958,456 | 9/1990 | Chaudoin ................................. 43/124 |
| 4,961,283 | 10/1990 | Forbes ..................................... 43/124 |
| 5,099,598 | 3/1992 | Carter ...................................... 43/144 |
| 5,203,108 | 4/1993 | Washburn ................................ 43/124 |
| 5,349,778 | 9/1994 | Chu ......................................... 43/124 |
| 5,678,352 | 10/1997 | Leitner .................................... 43/124 |
| 5,792,419 | 8/1998 | Williamson ............................. 43/124 |

*Primary Examiner*—Kurt Rowan
*Attorney, Agent, or Firm*—Haugen Law Firm PLLP

[57] ABSTRACT

A method of pest control which includes heating the effected area to a temperature which is lethal for the pest being exterminated, and maintaining this elevated temperature in the zone for a period of at least about eleven hours. The treatment is undertaken after determining the air penetration parameters for the treatment zone, so as to be able to determine the CFM requirements for achieving an air flow rate of between three and five air changes per hour in the treatment zone. Heated outside air is introduced to the treatment zone at a temperature of at least 200° F., with the temperature in the treatment zone being elevated at a rate of between about 5° F. and 10° F. per hour until the air temperature reaches the lethal level.

3 Claims, 1 Drawing Sheet

PEST CONTROL SYSTEM

BACKGROUND OF THE INVENTION

The present invention relates generally to a method for exterminating pests by thermal treatment of enclosed pest-occupying zones, wherein the zone is treated with heated outside air under controlled conditions for a period of time sufficient to achieve extermination of the pests. The term "pests" is intended to refer generally to creatures such as insects, mammals, reptiles, and the like.

In the past, various techniques have been employed to exterminate pests, including the introduction of toxic or lethal gases, such as those used in typical fumigation techniques including methyl bromide, phosphine, or the like. These techniques involve certain risks to personnel, as well as to the environment, and hence are not readily undertaken without necessary precautions. Some are environmentally unfriendly. On the other hand, the present invention involves a technique for treating the zone or area thermally, with this technique being effective while creating little if any danger to the ambient atmosphere or the environment. Delays resulting from extended periods of venting are also avoided.

The technique of the present invention is adaptable for use in a wide variety of structures and enclosures. This includes zones which are situated within older structures, as well as more modern structures. The magnitude of the volume requiring treatment poses few problems or limitations. While it is appropriate that the heat generating equipment be properly sized. Also, the process may be undertaken utilizing conventional fuels including natural gas, propane, steam, electricity, or combinations thereof.

SUMMARY OF THE INVENTION

In accordance with the present invention, a technique is provided wherein heat is provided utilizing heated outside air, with the heated outside air being delivered or discharged to the treatment zone at a temperature of at least 200° F. and at a volume rate sufficient to achieve between about three and five air changes per hour. Additionally, the treatment zone temperature is ramped-up from the normal temperature to a temperature sufficiently high to be lethal to the relevant pests. The ramp-up temperature rate is preferably about 10° F. per hour, with this ramp-up rate being sufficient to trap pests, particularly mammals or reptiles before they are able to escape the zone. This ramp-up temperature rate is also important to avoid structural damage due to induced thermal stresses within the treatment zone.

The term "lethal temperature" is intended to refer to a temperature which is sufficient to provide a kill for the pest. In this connection, a temperature of about 120° F.–130° F. is generally adequate, however some pests, may require a slightly higher temperature to be effective.

While other heating equipment may be employed, direct-fired heaters are preferable. Additionally, for the process and technique to be effective, the temperature of air discharged into the treatment zone should be in excess of about 200° F. This provides an adequate level for effective extermination.

A ramp-up rate of up to about 10° F. is desirable. This is necessary in order to preserve structural integrity of the building or enclosure. Rates in excess of about 10° F. may result in adverse effects to the structure and its overall integrity. By controlling the ramp-up rate within this range, therefore, it is possible to both trap and kill the pests in hard-to-reach places, as well as reducing the impact of adverse affects due to induced thermal stresses.

As an alternative to a complete kill such as is normally achieved with most pests at temperatures in excess of about 120° F., these elevated temperatures may be effective for the destruction of any eggs, larvae, papae that may be present. Test cages may be employed to determine effectiveness of the overall thermal treatment.

The use of heated outside air provides an added advantage in the extermination technique. It has been found that certain pests may be able to withstand elevated temperatures when the relative humidity within the treatment zone is relatively high. The utilization of outside air is effective in holding the relative humidity of the treatment zone down to a point where the pests are not given this added measure of protection. Heated outside air is also advantageous in that water vapor present within the treatment zone is being continuously driven from the zone, without being retained and/or accumulated as would be the case in a system employing recirculation.

Therefore, it is a primary object of the present invention to provide an improved technique for extermination of pests, including insects, mammals and reptiles, through thermal treatment, with the treatment utilizing outside air heated to a discharge temperature of at least 200° F. and being effective for extermination, while at the same time being free of adverse side effects to the structure.

It is a further object of the present invention to provide an improved technique for the extermination of pests including insects, mammals such as rats, mice and the like, as well as reptiles, wherein the technique is undertaken thermally so as to avoid use of toxic gases which may pose environmental as well as personnel hazards.

It is yet a further object of the present invention to provide an effective time-expedient technique for pest extermination utilizing thermal treatment for undertaking and completing the extermination operation.

Other and further objects of the present invention will become apparent to those skilled in the art upon a study of the following specification, appended claims, and accompanying drawings.

IN THE DRAWINGS

FIG. 1 is a flow chart representing the major preliminary steps involved in defining the requirements for equipment to be utilized in the contemplated treatment process; and FIG. 2 is a block diagram illustrating the steps to be undertaken in the pest extermination operation of the present invention.

DESCRIPTION OF THE PREFERRED EMBODIMENT

Figure 1:
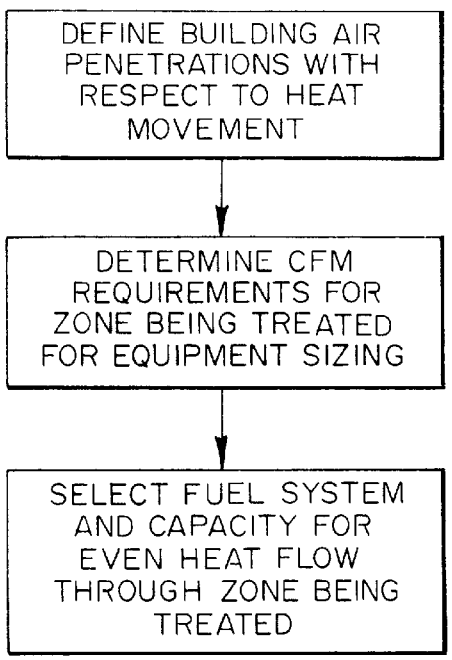
Figure 2:
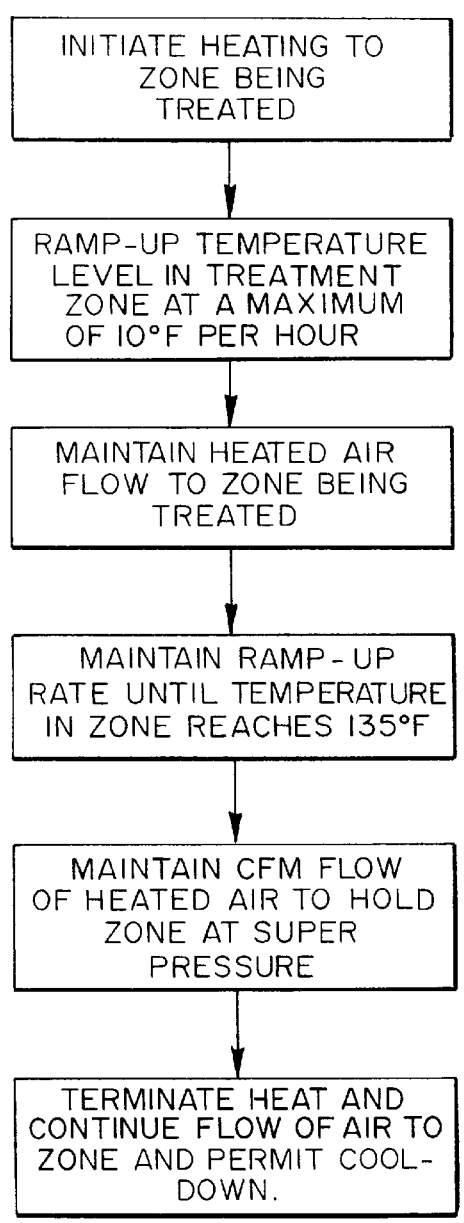

In accordance with the preferred embodiment of the present invention, the thermal treatment of a zone for extermination of pests is undertaken as follows. It is believed that the recitation of steps set forth below will enable those of skill in the art to readily and effectively practice the technique.

Treatment Zone Defined

The dimensions, type of structure, as well as area of structure for heat treatment is analyzed and determined. This determination will enable the technician to establish some basic guidelines for the equipment necessary to effectively handle the procedure. Accordingly, the nature of the fuel supply is determined, along with the equipment installation factors.

The step of defining building air penetrations is then undertaken with respect to heat movement, air distribution, placement of the equipment being utilized, and desired locations for heated air discharge. This step may generally be characterized as the determination of air penetration parameters for the treatment zone.

Availability and adequacy of power for the heating system being employed is then established.

The treatment zone is then treated with a flow of air in order to determine the actual CFM requirements for the area being treated. As a preliminary or an alternative, building data may be analyzed and used to determine this factor as well. Through this information, the specific heat loss calculations may be made in order to more specifically determine the quantity and size of equipment necessary, including heaters, fans, ductwork, and the like. Placement of equipment may then be readily determined.

Adequacy of fuel supply, either temporary or permanent, is then determined. The requirements of the fuel supply is established by the energy available on-site and the equipment being used, such as natural gas, propane, steam, electricity, or combinations thereof.

With the equipment in place, means are provided to provide 100% outside air to be discharged within the treatment zone of at least 200° F. during the treating process.

The requisite air flow rate for the process is targeted at between three and five air changes per hour in the treatment zone. This amount of heat and air flow through the zone is necessary in order to be certain that those interior hard-to-reach zones such as intra-wall spacings and the like are effectively treated. Also, this assures an even flow of heat to all areas and an even temperature pattern being achieved throughout the treatment zone. With 200° F. air flowing at the desired rate throughout the treatment zone, the zone is under a positive air pressure so as to achieve maximum heat penetration in all of the areas, including exterior as well as interior wall areas.

Heat is provided to the outside air until a temperature of at least 200° F. is reached and it is then discharged at a volume rate sufficient to ramp-up the temperature within the zone at a maximum rate of about 10° F. per hour. The volume rate is selected to be sufficient to provide for between about three and five air changes per hour within the treatment zone. This discharge and ramp-up rate is continued until an air temperature at least equal to the lethal temperature for the pests is achieved. Generally, a temperature of about 120° F–130° F. is satisfactory and constitutes an appropriate lethal temperature. The requisite temperature and air flow rate is maintained to continue providing between three and five air changes per hour, with the lethal temperature also being maintained within the treatment zone for a period of at least about eleven hours. For some more resistant insects, such as lesser grain borers, as may be found in and around grain storage elevators and the like, the elevated temperature and air change cycles are preferably maintained for periods ranging from between about eleven hours and 24 hours. Upon reaching the desired treatment time, the heat is turned-off, and with outside air, the flow is continued from a gradual cool-down.

In order to provide a further means of determining that a sufficient lethal or elevated temperature is reached, and that the lethal temperature has been achieved for a sufficient period of time, test cages may be set in place throughout the treatment zone and monitoring of these test cages will normally be adequate to indicate the total effectiveness of the kill.

It will be appreciated, of course, that various modifications may be made in the steps undertaken and defined hereinabove, without actually departing from the spirit and scope of the invention.

What is claimed is:

1. Pest extermination by thermal treatment of enclosed pest-occupying zones comprising the steps of:

(a) determining the air penetration parameters for the treatment zone;

(b) determining CFM requirements for achieving requisite air flow rate goal of between three and five air changes per hour in treatment zone;

(c) introducing heated outside air into treatment zone at a temperature of at least about 200° F. and at the requisite air flow rate;

(d) elevating temperature in treatment zone at ramp rate of between about 5° F. and 10° F. per hour until air temperature in the zone reaches level at least equal to the lethal temperature for pests in the treatment zone while maintaining requisite air flow rate; and (e) maintaining lethal temperature in treatment zone for at least about eleven hours while maintaining requisite air flow rate.

2. The pest extermination by thermal treatment of enclosed pest-occupying zones of claim 1 wherein said elevated temperature is maintained at a range of at least 120° F.

3. The pest extermination by thermal treatment of enclosed pest-occupying zones of claim 1 being particularly characterized in that said ramp rate is substantially 10° F. per hour.

* * * * *